United States Patent [19]
Zeff et al.

[11] Patent Number: 4,780,287
[45] Date of Patent: Oct. 25, 1988

[54] DECOMPOSITION OF VOLATILE ORGANIC HALOGENATED COMPOUNDS CONTAINED IN GASES

[75] Inventors: Jack D. Zeff, Marina Del Rey; Eriks Leitis, Los Angeles, both of Calif.

[73] Assignee: Ultrox International, Santa Ana, Calif.

[21] Appl. No.: 921,830

[22] Filed: Oct. 22, 1986

Related U.S. Application Data

[63] Continuation of Ser. No. 627,392, Jul. 3, 1984.

[51] Int. Cl.$^4$ .............................................. B01J 19/08
[52] U.S. Cl. ............................ 422/186.3; 422/186.07; 422/186.08; 422/186.1; 422/236; 422/121
[58] Field of Search ................ 422/186.3, 121, 186.07, 422/186.08, 186.1, 236; 204/158 P, 158 HA; 423/240

[56] References Cited

U.S. PATENT DOCUMENTS

| | | | |
|---|---|---|---|
| 1,969,655 | 8/1934 | Railey | 422/186.3 X |
| 3,067,115 | 1/1959 | Clingman | 422/186.3 X |
| 3,657,087 | 4/1972 | Scott | 204/158 P |
| 3,745,750 | 7/1973 | Arff . | |
| 3,772,425 | 11/1973 | Kany et al. . | |
| 3,924,139 | 12/1975 | Hirose et al. | 422/186.3 |
| 3,977,952 | 8/1976 | Knoevenagel et al. . | |
| 3,980,755 | 9/1976 | Black et al. . | |
| 4,039,623 | 8/1977 | Lavanish et al. . | |
| 4,045,316 | 8/1977 | Legan | 204/158 P |
| 4,045,538 | 8/1977 | Sare et al. . | |
| 4,118,191 | 10/1978 | Böhnenseter | 422/121 X |
| 4,144,152 | 3/1979 | Kitchens . | |
| 4,179,616 | 12/1979 | Couiello et al. | 422/186.3 |
| 4,210,503 | 1/1980 | Confer . | |
| 4,345,983 | 8/1982 | Wan . | |

FOREIGN PATENT DOCUMENTS

| | | | |
|---|---|---|---|
| 2817772 | 10/1979 | Fed. Rep. of Germany | 422/121 |
| 0183306 | 11/1982 | Japan | 422/186.09 |
| 0150589 | 8/1984 | Japan | 422/186.3 |
| 0114393 | 6/1985 | Japan | 422/186.3 |
| 1028445 | 2/1986 | Japan | 422/186.3 |
| 142637 | 4/1961 | U.S.S.R. . | |

Primary Examiner—John F. Terapane
Assistant Examiner—Susan Wolffe
Attorney, Agent, or Firm—Irell & Manella

[57] ABSTRACT

The invention is a method and apparatus for rate enhanced decomposition of volatile organic halogenated compounds. In the invention a stream of gas carrying these volatile organic halogenated compounds is passed through a porous bed of silica gel, preferably, or alternatively through quartz chips, and the bed is thereafter irradiated with ultraviolet light. If, after prolonged use the rate of decomposition declines, the decomposing activity can be fully restored by heating and/or passing nitrogen gas through the bed of silica gel. It has further been discovered that elevating the temperature of a solution of organic halogenated compounds, organic acids, or aryl alcohols, increases the oxidation rate of these compounds wherein irradiation of solution with ultraviolet light and addition of ozone to solution perform the oxidation. It has also been discovered that elevating the temperature of a solution of short chain alcohols, aryl alcohols, organic acids or aldehydes in solution, wherein addition of $H_2O_2$ to solution and irradiation of solution with ultraviolet light act as oxidizing agents, increases the oxidation rate of these compounds. Furthermore, it has been shown that the rate of decomposition of a solution of organic halogens, wherein ozone is added to the solution and the solution is irradiated with ultraviolet light to perform the decomposition, is increased by using an appreciable component of 185 nano-m energy.

38 Claims, 4 Drawing Sheets

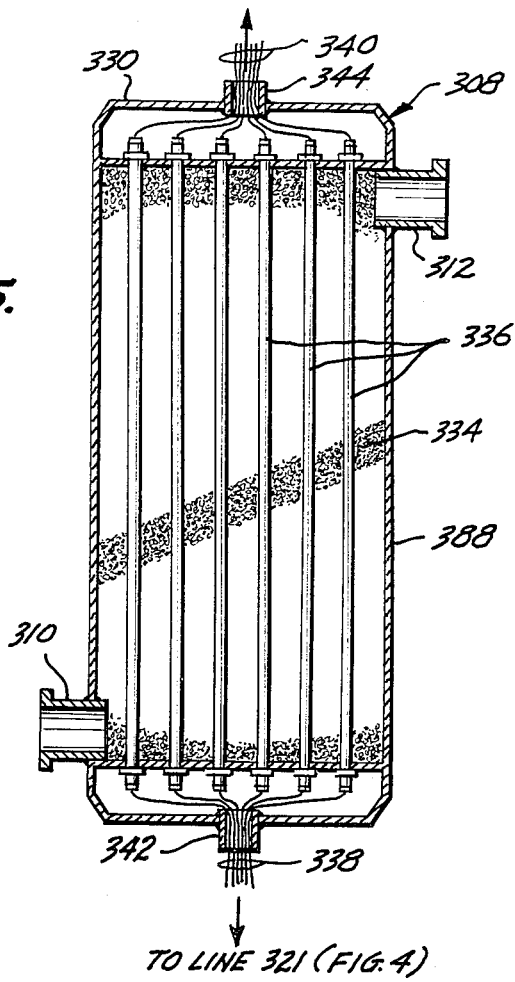
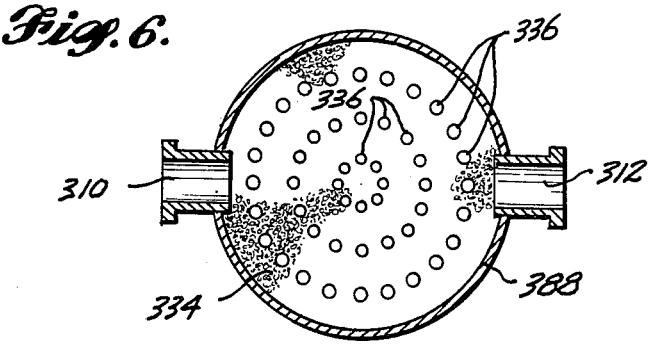

DECOMPOSITION OF VOLATILE ORGANIC HALOGENATED COMPOUNDS CONTAINED IN GASES

This is a continuation of co-pending application Ser. No. 627,392 filed on July 3, 1984.

FIELD OF THE INVENTION

The invention relates to a method and apparatus for decomposing volatile organic halogenated compounds contained in contaminated gases using silica gel and/or quartz chips in combination with ultraviolet light as an absorption medium/ catalyst.

BACKGROUND OF THE INVENTION

Although it is well known that ultraviolet light decomposes volatile organic, halogenated compounds contained in gases (See, U.S. Pat. Nos. 4,144,152 and 4,210,503), the rate of decomposition of these compounds has proven unsatisfactory when used in a system in which these compounds are volatilized from a rapidly flowing, aqueous solution and then treated with the ultraviolet light and/or when used in a system in which the flowing solution itself is treated with ultraviolet light. When ultraviolet light is used for decomposition in such systems, the ultraviolet light does not have sufficient time to effect appreciable decomposition of the continuously flowing halogenated compounds.

Flowing, aqueous systems containing these toxic undesirable compounds appear in a variety of situations; for example, potable water often contains these compounds and therefore must be purified prior to consumption. Additionally, a wide variety of industrial effluent solutions contain these compounds, one example being the waste water resulting from paint stripping. These compounds are toxic and therefore must be decomposed prior to environmental release. Known detoxification systems typically volatize the halogenated compounds from flowing solution into air; the contaminated air is then released to the atmosphere thereby causing toxic air pollution.

Thus, what is needed is an apparatus and a method which decomposes these toxic compounds quickly enough to remove them from flowing solutions. The apparatus and method should also be suitable for use as an air purification system.

SUMMARY OF THE INVENTION

The invention is primarily a method and apparatus for decomposing volatile, organic halogenated compounds contained in gases, consisting of passing the contaminated gases through a bed of quartz chips, or preferably silica gel, and treating the bed with ultraviolet light. The rate of decomposition of the organic halogenated compounds with the system of the present invention is significantly greater than the rate observed when gases containing these compounds are treated with ultraviolet light in the absence of quartz chips or silica gel.

It is an object of this invention to provide a sufficient rate of decomposition of volatile organic halogenated compounds contained in gases so that such compounds volatilized from a flowing solution, or contained in flowing gaseous systems, can be completely, or substantially, decomposed.

If the apparatus is an embodiment which employs a bed of silica gel, and if the apparatus is used for decomposition over prolonged periods, the rate of decomposition often decreases slightly. Heating the bed and/or passing nitrogen gas through the bed restores the apparatus to its full decomposing activity.

Thus, it is a further object of the invention to provide a method for restoring the apparatus of the invention to full decomposing activity after use for prolonged periods.

It has also been discovered that in a system in which volatile organic halogenated compounds are decomposed in aqueous solution by adding ozone to the solution and then treating the solution with ultraviolet light, the rate of decomposition is significantly enhanced by using lamps which emit an appreciable proportion of their energy at 185 nano-m.

Additionally, in a system in which organic acids, short chain alcohols, aryl alcohols, or aldehydes in aqueous solution are oxidized by adding $H_2O_2$ to the solution and then irradiating the solution with ultraviolet light, the rate of decomposition is increased by elevating the temperature of solution.

It has further been discovered that the oxidation rate of organic halogens, organic acids, or aryl alcohols in solution, wherein ozone is added to the solution and the solution is irradiated with ultraviolet light to perform the oxidation, is enhanced by elevating the temperature of solution.

Thus, it is a further object of the invention to increase the oxidation rate of organic compounds and/or halogenated compounds in aqueous solution, wherein addition of $H_2O_2$ or ozone to the solution followed by irradiation with ultraviolet light is the method by which these compounds are oxidized.

DETAILED DESCRIPTION OF THE INVENTION

First Preferred Embodiment

Figure 1:
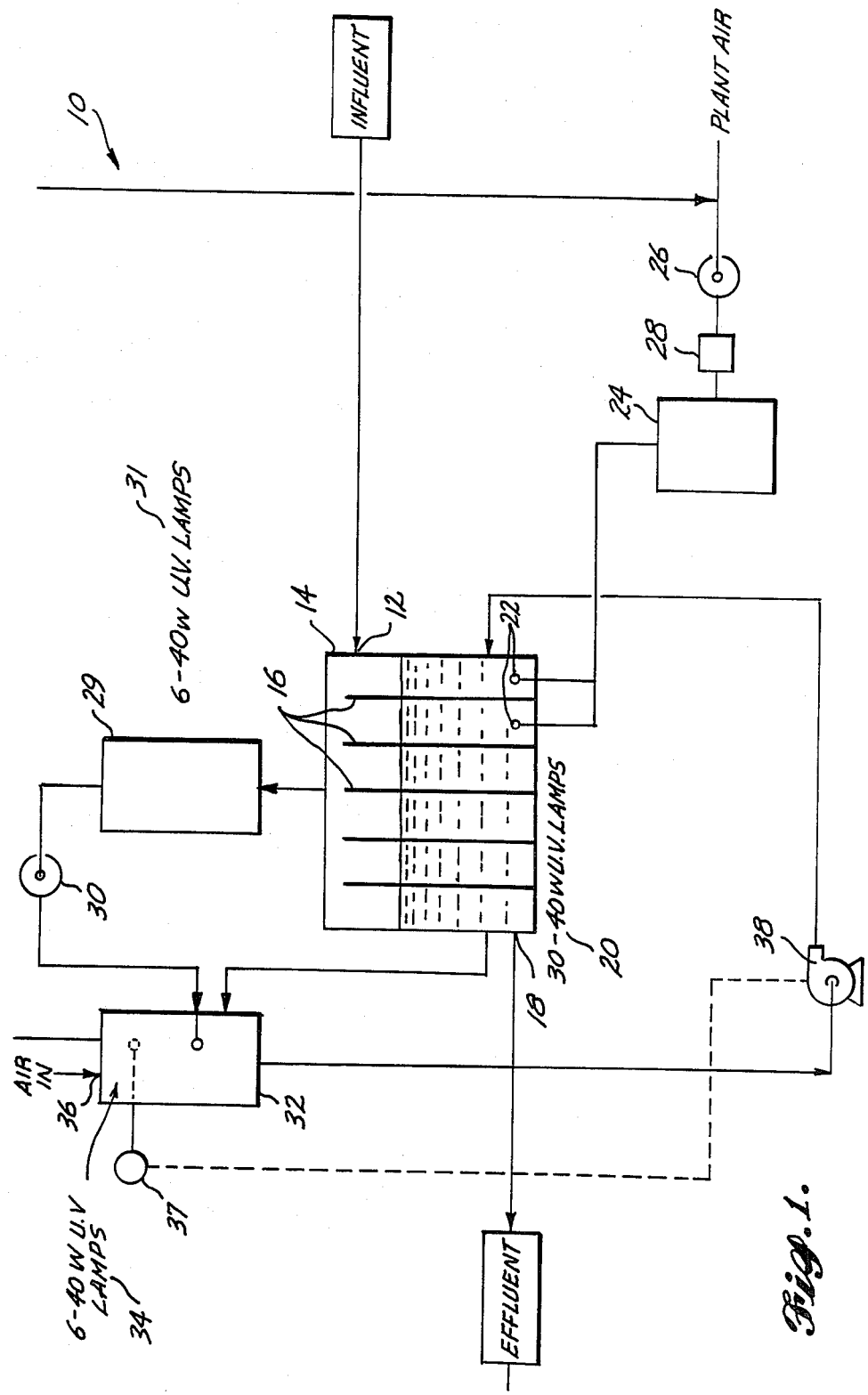
FIG. 1 shows a system for removing volatile organic halogenated compounds from potable water.

Referring to FIG. 1, a system 10 is shown suitable for purifying a water supply containing trichloroethylene in concentrations of from 15 to 40 parts per billion. The system 10 has a water influent port 12, typically admitting 20 to 30 gallons per minute, a reactor tank 14 with a series of baffles 16, and a water effluent port 18. The water contaminated with trichloroethylene flows into influent port 12 through baffles 16, and out through effluent port 18. Baffles 16 do not extend across the entire width of reactor tank 14, rather baffles 16 are disposed in the tank 14 such that the water flows around the sides of baffles 16; this baffle design prevents backmixing of contaminated with decontaminated water and may also enhance ozone diffusion throughout the water in tank 14.

The reactor tank 14 is equipped with thirty 40 Watt ultraviolet lamps 20 which provide electromagnetic radiation which includes some wavelengths from 185 nano-m to 254 nano-m. The portion of tank 14 near the influent port 12 has two tubular diffuser inlets 22 which admit an ozone/air mixture, produced by an ozone generator 24, into tank 14 and also aid in dispersing this mixture throughout the solution in tank 14. The ozone-/air mixture in tank 14 acts in conjunction with the known decomposing action of the ultraviolet light produced by the lamps 20 and oxidizes most of the trichloroethylene in solution.

A compressor 26 provides air to ozone generator 24 and a dryer 28 is positioned between compressor 26 and ozone generator 24 to ensure that the ozone generator's efficiency is not impeded by the presence of water in the air supply.

Following treatment of the water with ozone and ultraviolet light, the trichloroethylene and other volatile compounds volatized by the ozone/air mixture are pumped to a detoxification unit 29 by means of a compressor 30. Detoxification unit 29 is essentially a column of porous silica gel (quartz chips can also be used with the invention) wherein six 40 watt ultraviolet lamps 31 are positioned to irradiate the column. As will be discussed further late, it has been discovered that passing gases carrying volatile organic halogenated compounds (such as the trichloroethylene) through a bed of silica gel or quartz chips and irradiating the bed with ultraviolet light, substantially enhances the rate of decomposition of these compounds. Thus, detoxification unit 29 decomposes the trichloroethylene not decomposed by the action of the ultraviolet light and the ozone in reactor tank 14; near complete decomposition of the toxic trichloroethylene results.

Following treatment by detoxification unit 29, the resulting gases, which include some ozone, are pumped by a compressor 30 to a degasser 32. Degasser 32 has substantially detoxified water—which has had the volatile organic halogenated compounds volatized from it and which has also been treated with ozone and ultraviolet light within reactor tank 14—flowing to it from the effluent end of tank 14. Degasser 32 employs six ultraviolet lamps 34 to provide ultraviolet light which decomposes residual ozone. An air inlet port 36 is also provided on degasser 32 to add make-up air to the system.

A level gauge 37 is associated with degasser 32 and when degasser 32 becomes filled with detoxified water, a feedback system between level gauge 37 and a centrifugal pump 38 turns on pump 38 and water is pumped from the bottom of degasser 32 back to reactor tank 14. The water pumped back will contain any un-volatized or un-decomposed halogenated compounds; thus, these compounds are returned to the system for further treatment and oxidation.

Air, which has had the ozone removed therefrom by degasser 32, is returned to compressor 26 which mixes make-up air with the recycled air. Compressor 26 pumps the gaseous mixture to air dryer 28 which in turn feeds dried air to an ozone generator 24; thus, no gases or volatile organics are vented to the atmosphere.

It can be seen that a cost-efficient system which decomposes nearly all the toxic trichloroethylene in drinking water is provided. Because the detoxification unit 29 can also quickly decompose other volatile organic halogenated compounds, for example: nitrosamines; carbon tetrachloride; tetrachloroethylene; vinyl chloride; ethylene dibromide; methylene chloride, 1,1,1,-trichloroethane; chlorobenzene; hexachloroethane; 1,1-dichloroethane; 1,1,2-trichloroethane, 1,1,2,2-tetrachloroethane; chloroethane; bis(chloromethyl) ether; bis (2-chloroethyl) ether; 2-chloroethyl vinyl ether (mixed); chloroform; 1,2-dichlorobenzene; 1,3-dichlorobenzene; 1,4-dichlorobenzene; 1,1-dichloroethylene; 1,2-trans-dichloroethylene; 1,2-dichloropropane; 1,2-dichloropropylene; bis (2-chloroisopropyl) ether; bis (2-chloroethoxy) methane; methyl chloride; methyl bromide; bromoform; dichlorobromomethane; trichlorobromomethane; trichlorofluoromethane; dichlorofluoromethane; chlorodibromomethane; this same system can be used to detoxify water contaminated with any of these compounds.

Alternate Preferred Embodiment

Figure 2:
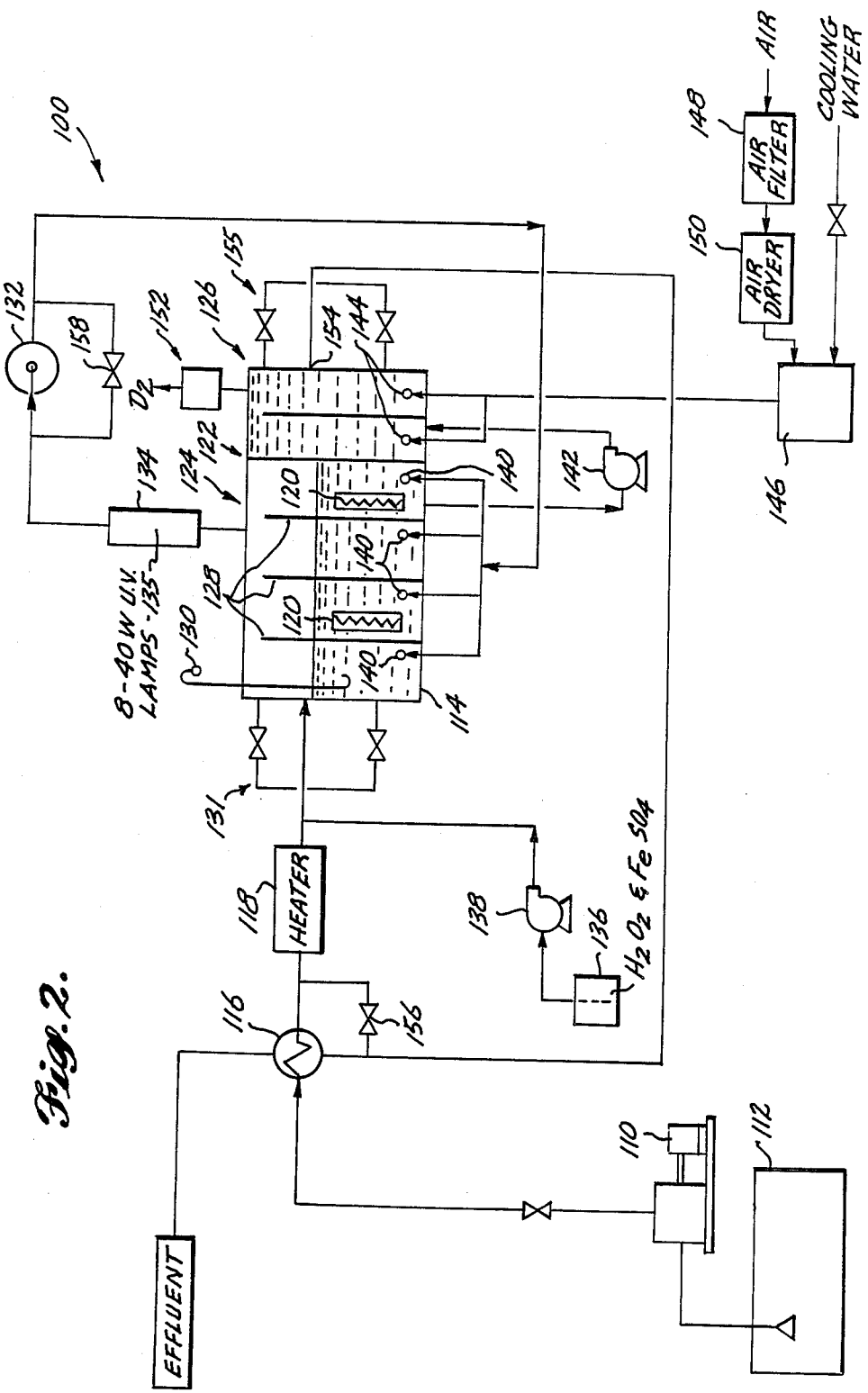
FIG. 2 shows a system for removing phenol and volatile organic halogenated compounds from wastewater produced following paint stripping.

Referring to FIG. 2, a system 100 is shown suitable for removing methylene chloride and phenol from waste water—both compounds are typical by-products of paint stripping. Waste water, contaminated with up to 4,000 parts per million of methylene chloride and also contaminated with phenol, is pumped by a pump 110 from a tank 112 at a rate of 3 to 4 gallons per minute. The water passes through a heat exchanger 116 and is then pre-heated to about 75° to 80° C. by a heater 118; thereafter it enters a reactor tank 114. Reactor tank 114 is equipped with a set of internal heaters 120 which maintain the reaction temperature of the waste water. Maintaining the reaction temperature enhances oxidation of phenol and also may serve to enhance the rate of methylene chloride vaporization and decomposition.

Reactor tank 114 is provided with an impermeable wall 122 which divides tank 114 into first and second sections 124 and 126, respectively First section 124 houses internal heaters 120 as well as four baffles 128. The baffles 128 are designed to extend only part-way across tank 114 in order to prevent back-mixing of the water. This design may also enhance dispersion of gases which enter tank 114 through a set of tubular diffusers 140. Tank 114 is also equipped with an air inlet 130 to provide make-up air to the system. Tank 114 can be provided with a levelling gauge 131 to indicate the water level in the tank.

A compressor 132 pumps air, carrying methylene chloride volatized by the gases entering through tubular diffusers 140, from the top of tank 114 into a detoxification unit 134. Detoxification unit 134 is essentially the same as detoxification unit 29. Detoxification unit 134 is designed to decompose the volatized methylene chloride and is essentially a porous bed of silica gel (or quartz chips) irradiated with eight 40 Watt ultraviolet lamps 135 which provide ultraviolet light. The ultraviolet light includes some wavelengths from 185 nanometer to 254 nanometer. Due to the similarity between detoxification unit 134 and detoxification unit 29, system 100 can decompose all the same volatile organic halogenated compounds which can be decomposed by system 10.

It can be seen in FIG. 2 that prior to entry of the waste water into tank 114, a solution of $H_2O_2$ and $FeSO_4$ (pumped from a tank 136 by a diaphram pump 138) is added to the waste water. This solution serves to oxidize the phenol and, as discussed previously, works best when the waste water is heated.

It should be noted that paint stripping waste water typically contains traces of the following elements.

| ELEMENT | CONCENTRATION (ppm) |
| --- | --- |
| Chromium | 51.0 |
| Zinc | 10.0 |

| -continued | |
|---|---|
| ELEMENT | CONCENTRATION (ppm) |
| Copper | 0.05 |
| Nickel | 0.06 |
| Cadmium | 0.02 |
| Lead | 0.2 |

The addition of the $FeSO_4$, which acts as an oxidation catalyst for phenol, may be unnecessary as one or more of these elements which already are in the waste-water could act as the phenol oxidation catalyst.

Following treatment in detoxification unit 134, compressor 132 pumps the gases from the top of unit 134 and through a series of tubular diffusers 140 which bubble the gases into first section 124 of tank 114. The gases so treated will be almost completely free of methylene chloride which has been decomposed to, inter alia, formic acid. FIG. 2 shows that the gases are pumped by compressor 132 from near the midpoint of first section 124. After the waste-water has passed through the first two of the four baffles 128 and is near the midpoint of first section 124, most of the halogenated compounds have been volatized from the water; thus, water near wall 122 is essentially detoxified. The gases treated in unit 134 are returned to all portions of first section 124, however, these gases have been detoxified and therefore do not add to the toxicity of the water near wall 122.

The detoxified water near wall 122 is pumped by a centrifugal pump 142 into second section 126 of tank 114. Also entering second section 126 through a set of tubular diffusers 144 is ozone produced by an ozone generator 146. The detoxified water and ozone are mixed in second section 126 to oxidize the intermediate aliphatic acids produced by the oxidation of phenol. Ozone then passes from the top of second section 126 into an ozone decomposer 152 which produces oxygen and releases it to the atmosphere.

Air entering ozone generator 146 first passes through an air filter 148 and an air dryer 150 which respectively filter and then dry the entering air. Water is pumped into ozone generator 146 in order to cool the generator.

Second section 126 is generally nearly full of water—first section 124 is usually about one-half full and has a layer of foam, produced by volatization, atop the water—and water is pumped from near the top of second section 126 through an effluent port 154. The effluent water is thus free (or nearly free) of phenol, methylene chloride and formic acid and is safe for environmental release.

It can be seen that the water exiting second section 126 will be at an elevated temperature as it has been heated at several points along its flow route. Heat exchanger 116 uses the heat of the effluent water to aid in pre-heating the influent water prior to its entry into tank 114 and energy is thereby conserved. Alternatively, water exiting second section 126 can pass through a by-pass 156 which circumvents heat exchanger 116 and channels the effluent water to tank 114 for re-purification.

Second section 126 can also be equipped with a level gauge 155, and system 100 can be provided, at any of a number of locations, with water flow meters and water temperature indicators (not shown). Compressor 132 can be equipped for flow control with a by-pass 158 which allows the gases flowing from detoxification unit 134 to flow around, rather than through, compressor 132.

It would also be possible to use system 100 for detoxification of waste water which contains volatile organic halogenated compounds but contains no phenol. For treatment of phenol-free waste water one would simply not add the $H_2O_2$ and the $FeSO_4$ to the waste water.

Description of a Detoxification Unit

Figure 4:
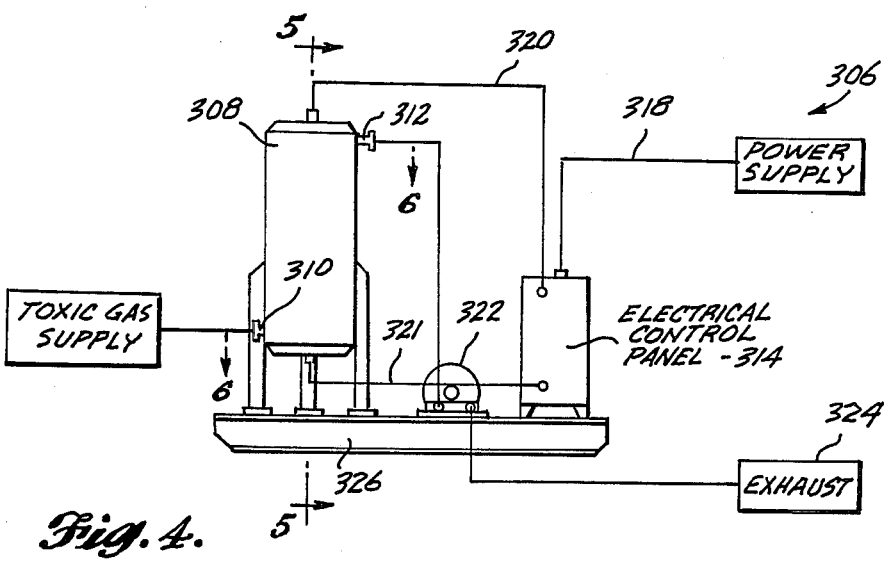
FIG. 4 shows a detoxification unit for use in the systems of FIGS. 1 and 2.
Figure 3:
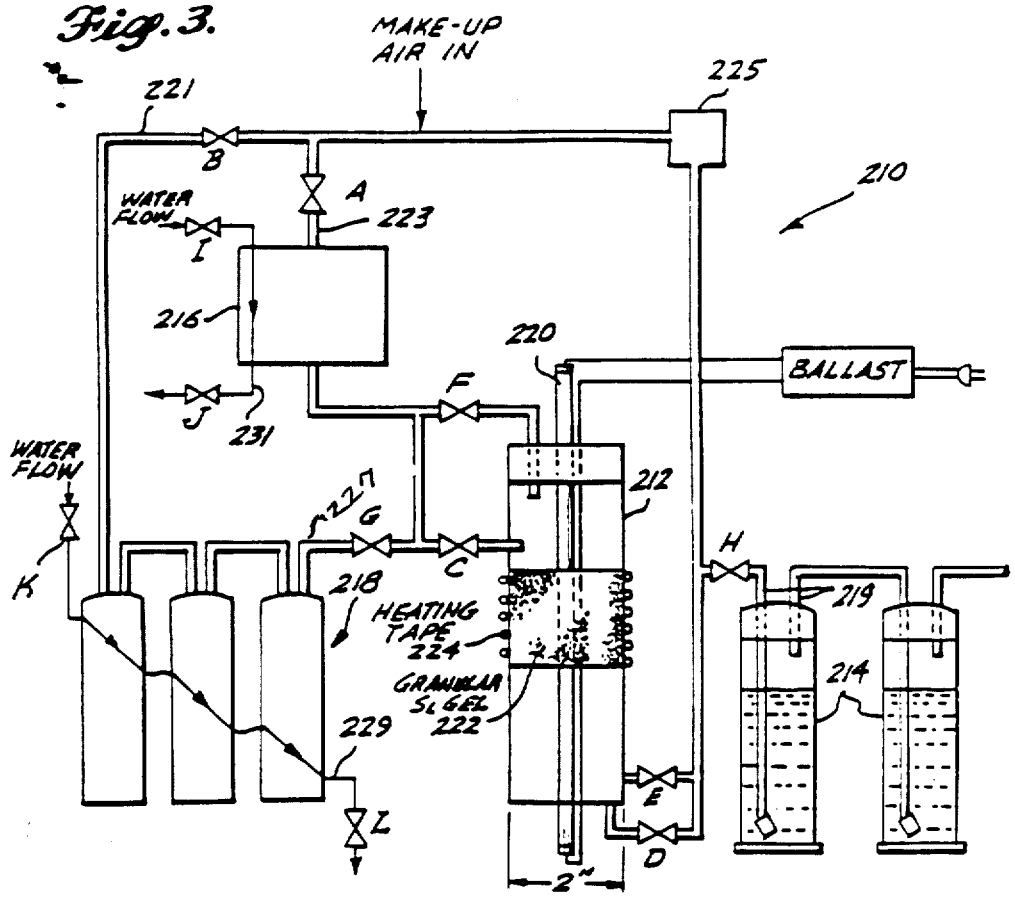
Figure 4:
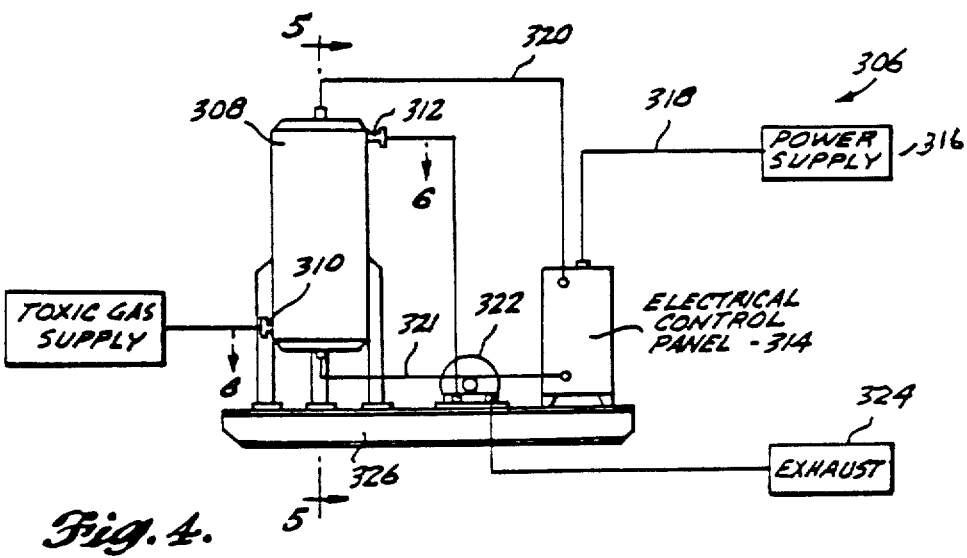

Referring to FIG. 4, a system 306 is shown. System 306 includes a model detoxification unit 308 having a toxic air supply port 310 and an exhaust port 312 and further includes an electrical control panel 314, a power supply 316 and power lines 318, 320, and 321. Detoxification unit 308, electrical control panel 314 and a compressor 322, which pumps the toxic air or gases into detoxification unit 308, all rest on a base 326.

The detoxification unit 308, along with the other portions of system 306, can be used as the detoxification unit portion of either of systems 10 or 100.

Figure 5:
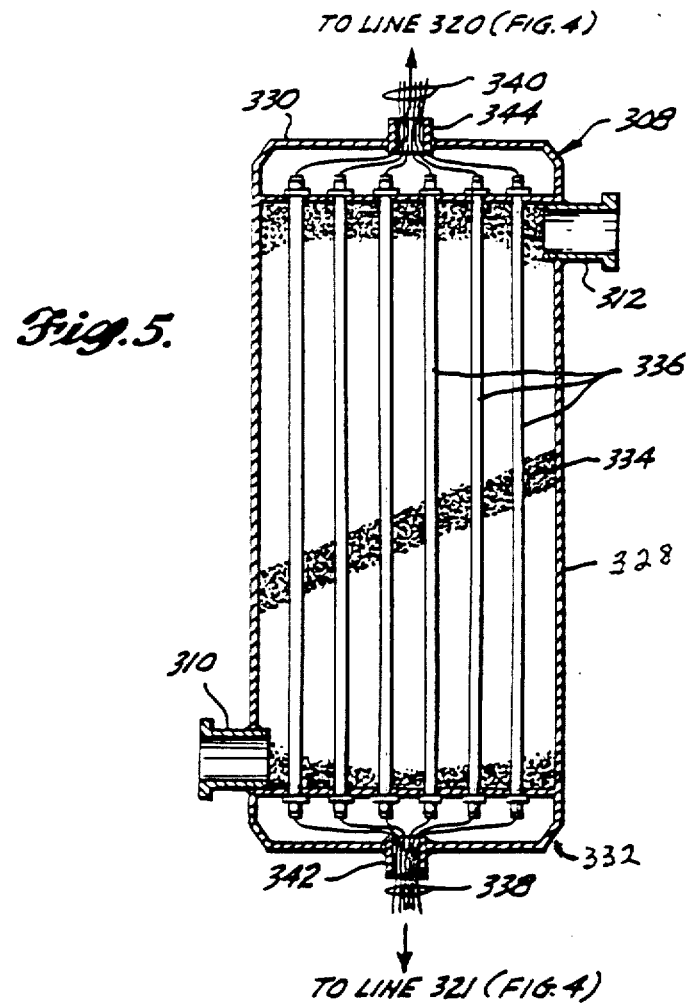
FIG. 5 is a sectional view of the detoxification unit of FIG. 4 taken along the lines 5—5.

Referring to FIG. 5, a sectional view of detoxification unit 308 taken along the lines 5—5, is shown. Detoxification unit 308 has a housing 328 with caps 330 and 332, respectively, affixed to the upper and lower ends of housing 328. Housing 328 provides a hermetic seal around a 6 to 16 mesh porous silica gel bed 334 (alternatively, a porous bed of quartz chips can be used) and also around a plurality of 40 watt low pressure, high intensity, ultraviolet lamps 336. Toxic gases flow through air supply port 310, through the silica gel bed 334, and out through exhaust port 312. The ultraviolet light provided by lamps 336 irradiates silica gel bed 334 and acts to aid in decomposing any volatile organic halogenated compounds in the gases. Lamp leads 338 and 340 respectively positioned in mouths 342 and 344, supply power to the lamps 336 from the power lines 321 and 320.

Figure 6:
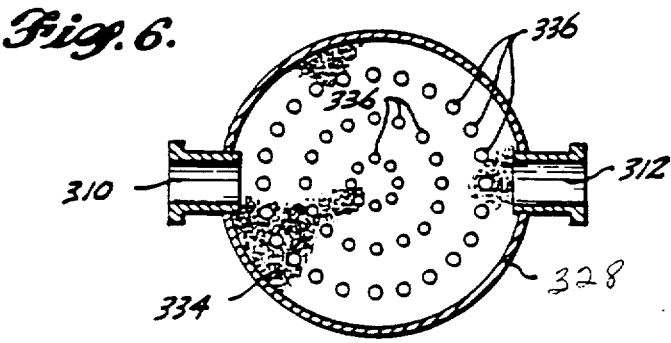
FIG. 6 is a sectional view of the detoxification unit of FIG. 4 taken along the lines 6—6.

Referring to FIG. 6, a sectional view of detoxification unit 308 taken along the lines 6—6 is shown. FIG. 6 shows forty-eight lamps 336; a greater or a lesser number of lamps can be used in other embodiments of the invention.

Description of Experimental Procedures

1. The Efficacy of the Detoxification Unit

Prior to developing systems 10 and 100, both of which are suitable for commercial applications, the inventors performed experiments with a prototype detoxification unit to determine the unit's efficacy in decomposing volatile organic halogenated compounds.

In a set of experiments, the results of which are summarized at Table A, the efficacy of decomposing volatile organic halogenated compounds carried by gases, wherein the gases are passed through a bed of silica gel which is irradiated with ultraviolet light, was conclusively demonstrated.

Figure 3:
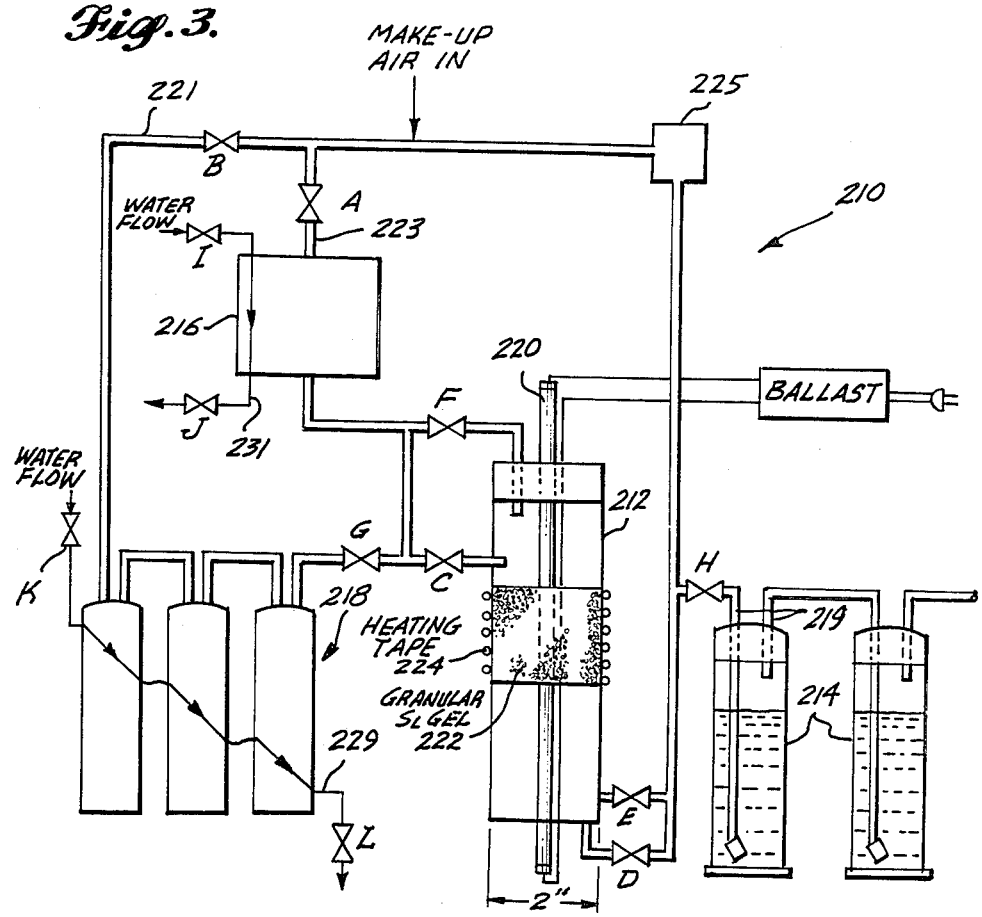
FIG. 3 shows an apparatus which was used to test the efficacy of the invention.

In the experiments summarized at Table A, a 1 inch diameter embodiment of a detoxification unit, similar in all other respects to 2 inch embodiment of a detoxification unit seen in FIG. 3, was used. A compressed cylinder of air and vinyl chloride, containing 53 ppm vinyl chloride, released the compressed mixture at 4 liters/minute for 15 minutes into the detoxification unit. The products were thereafter passed through a charcoal bed. Charcoal is known to absorb vinyl chloride; therefore undecomposed vinyl chloride was trapped in the bed. Gas chromatography was performed on the charcoal to determine the amount of undecomposed vinyl chloride and from this determination the percentage of decomposition can be readily seen.

TABLE A

| RUN NO. | CONDITIONS | PERCENTAGE OF VINYL CHLORIDE FOUND IN TRAP |
|---|---|---|
| 1 | Detoxification unit by-passed by the compressed mixture. | 100% |
| 2 | Mixture passes through the detoxification unit. | 0.03% |
| 3 | Mixture passes through the detoxification unit but the UV light is off. | 36% |
| 4 | Mixture passes through detoxification unit but the silica gel bed has been removed from detoxification unit, U.V. light is on. | 5.8% |

Thus, comparing the amount trapped shown in Run No. 4 (without silica gel), to the amount trapped in Run No. 2 (using ultraviolet light irradiation of the silica gel bed), one can see that a considerably greater percentage of the vinyl chloride is destroyed when using ultraviolet light irradiation of the silica gel bed. Another series of experiments were performed all of which involved passing air carrying organic halogenated compounds through a silica gel bed which is irradiated with ultraviolet light; the results are summarized on Table 1.

TABLE 1
DESTRUCTION OF ORGANIC HALOGENATED COMPOUNDS BY DETOXIFICATION UNIT

| Model compound | D-Tox diameter (inches) | Number of runs | Time (min) | Air Type | Air Flow (L/min) | Water Type | Water Vol. (L) | Water Flow (L/min) | Toxic compounds at start Concentration | Total amount | Amounts after Treatment In Trap*** | In Solution | Percent destroyed |
|---|---|---|---|---|---|---|---|---|---|---|---|---|---|
| TCE[3] | 2 | 5 | 30 | Open | 6 | Batch | 1.0 | None | 5.0 ppm | 5. mg | 0.15 mg (pentane) | N.D. | 97 |
| TCE[3] | 2 | 1 | 60 | Open | 2 | Batch | 1.0 | None | 4.0 ppm | 4 mg | 0.05 mg (pentane) | N.D. | 99 |
| TCE[3] | 2 | 2 | 30 | Open | 2 | Batch | 1.0 | None | 1.5 ppm | 1.5 mg | 0.037 mg (pentane) | N.D. | 98 |
| TCE[3] | 2 | 11 | 30 | Open | 4 | Batch | 1.0 | None | 5.0 ppm | 5 mg | 0.17 mg (pentane) | N.D. | 97 |
| TCE[4] | 2 | 6 | 30 | Open | 4 | Batch | 1.0 | None | 5.0 ppm | 5 mg | 0.23 mg (pentane) | N.D. | 96 |
| EDB | 2 | 9 | 30 | Open | 4 | Batch | 1.0 | None | 5.0 ppm | 5 mg | 0.077 mg (MeOH) | N.D. | 98 |
| TCE[3] | 1.5 | 1 | 30 | Cyclic | 30 | Batch | 3.3 | None | 5.0 ppm | 16.5 mg | N/A | 0.18 mg | 99 |
| TCE[3] | 1.5 | 1 | 15 | Cyclic | 10 | Batch | 3.3 | None | 1.0 ppm | 1.8 mg | N/A | 0.05 mg | 97 |
| TCE[4] | 1 | 1 | 30 | Cyclic | 7.5 | Batch | 0.85 | None | 5.0 ppm | 4.2 mg | N/A | 0.0034 mg | 99 |
| EDB | 1 | 1 | 30 | Cyclic | 7.5 | Batch | 0.85 | None | 5.0 ppm | 4.2 mg | N/A | 0.26 mg | 94 |
| TCA | 1 | 1 | 30 | Cyclic | 7.5 | Batch | 0.85 | None | 5.0 ppm | 4.2 mg | N/A | 0.18 mg | 96 |
| TCE[3] | 1 | 2 | 75 | Open | 10 | Flow | N/A | 0.5 | 5.0 ppm | 188 mg | 4 mg (MeOH) | 0.03 mg/100 ml | 94 |
| TCE[3] | 1 | 13 | 50 | Open | 45 | Flow | N/A | 1.0 | 5.0 ppm | 250 mg | 25 mg (MeOH) | ** | 85 |
| TCE[3] | 2.5 | 4 | 180 | Open | 9 | Flow | N/A | 0.9 | 5.0 ppm | 810 mg | 46 mg (toluene) | ** | 90 |
| TCE[4] | 2.5 | 4 | 180 | Open | 9 | Flow | N/A | 0.9 | 5.0 ppm | 810 mg | 72 mg (toluene) | ** | 89 |
| TCA | 2.5 | 4 | 180 | Open | 9 | Flow | N/A | 0.9 | 5.0 ppm | 810 mg | 69 mg (toluene) | ** | 85 |
| DBCP | 1.5 | 4 | 180 | Cyclic | 19 | Flow | N/A | 0.25 | 2.0 ppb | 0.09 mg | ** | 0.028 mg | 69 |
| DBCP | 1.5 | 1 | 45 | Cyclic | 19 | Flow | N/A | 0.10 | 2.0 ppb | 0.009 mg | ** | 0.0025 mg | 72 |
| CH$_2$=CHCL | 1 | 3 | 3 | Open | 4 | N/A | N/A | N/A | 53 ppm | 636 mg | N.D. | N/A | 99 |

*The solvent used in the traps is given in parenthesis.
**Indicates the amount of the toxic compound in solution after the treatment was not measured, however, analyses of the treated solutions under the same conditions indicated more than 95% removal of the model compounds.
***In the case of vinyl chloride the trap consisted of a charcoal column rather than a solvent.
N.D. means none was detectable.
N/A means not applicable
TCE[3] = trichloroethylene
TCE[4] = tetrachloroethylene
EDB = Ethylene Dibromide
TCA = 1,1,1, trichloroethane
DBCP = 1,2,dibromo-3,chloropropane Referring to FIG. 3, a basic catalytic decomposition test apparatus 210 which was essentially the apparatus used to perform the experiments summarized at Table 1, is shown. Tank 216 and bottles 218 contain aqueous solutions of the volatile organic halogenated compounds and air carrying these compounds was volatized from either tank 216 or bottles 218.

A variety of embodiments of test apparatus 210 were used. Valves A to H are shown to schematically indicate the different flow paths of the air carrying these compounds when this air passed through the different embodiments of test apparatus 210. Referring to Table 1, in the first, third and fifth group of experiments the air flow was "open", meaning that the air flowed along flow path 219 from the bottom of detoxification unit 212 to the scrubber bottles 214. Bottles 214 trap undecomposed organic halogenated compounds. In these groups of experiments no air flowed from unit 212 to either the tank 216 or to the bottles 218, this can be envisioned by closing valves A and B and opening valve H.

In the second and fourth group of experiments, the air flow was "cyclic", indicating that the air was pumped by compressor 225 along flow path 223 or 221 and was then returned to either of tank 216 or bottles 218. This can be envisioned by opening valves A or B and closing valve H.

Detoxification unit 212 is essentially a hermetic cylindrical housing with an ultraviolet lamp 220 extending through the center thereof, and with a granular silica gel bed 222 surrounded by heating tape 224. Heating tape 224, which heats silica gel bed 222, was activated between runs and nitrogen gas was simultaneously passed through silica gel bed 222. Although this heating/nitrogen treatment temporarily improved the efficacy of the detoxification unit, good results were also obtained without this treatment.

In the various runs of the experiments summarized in Table 1, air flowing from one of tank 216 or bottles 218 flows to the top of detoxification unit 212, through silica gel bed 222, and out through the bottom of detoxification unit 212. Several different embodiments of detoxification unit 212 were used with these experiments. Unit 212 shown in FIG. 3 has a 2 inch housing diameter; other embodiments of the detoxification unit had various housing diameters as indicated at Table 1. A make-up air inlet 230 is shown which can be used to add lost air to the system.

One can envision the bottles 218 not being used by closing valve G, indicating there is no gas flow along path 227 and that tank 216 supplied the gases to the system through open path 233. It is immaterial to the results which of tank 216 and bottles 218 were used with the various experimental runs as both are equivalent in function; therefore there is no indication in Table 1 which actually was used.

Valves C and F, and D and E, are shown to schematically indicate that there were two further different embodiments of unit 212, one of which allowed air flow through the sides of unit 212 (indicated schematically by opening valves C and E) and one of which allowed air flow through the top and bottom of the unit 212 (indicated schematically by opening valves F and D). The embodiment of unit 212 actually used is immaterial to the experimental results and is therefore not indicated in Table 1.

Valves I and J, and K and L, are shown to indicate that water can be flowing through one of flow paths 229 and 231 or can be batched, as indicated in Table 1.

In the case of vinyl chloride ($CH_2=CHCl$), this compound was not volatized from a solution in tank 216 or bottles 218 but rather was released from a compressed cylinder containing a mixture of air and vinyl chloride. The mixture was passed through the detoxification unit 212 and then to a charcoal column trap (not shown) rather than to bottles 214.

The "percent destroyed" column of Table 1 shows that the detoxification unit 212 effectively decomposed all of the organic halogenated compounds which were tested. In a set of runs initially performed with test apparatus 210, at one point there appeared to be a downward trend in the percentage of halogenated compound decomposition. Another run was performed and thereafter nitrogen gas was passed through the bed to determine if the nitrogen gas could regenerate the bed to full decomposing activity. The rate of decomposition increased back to about 98% indicating that a regeneration effect had in fact occurred.

Based on the result of the experiments summarized in Table 1 and Table A, it is hypothesized that the silica gel bed performs two functions which aid in halogenated compound decomposition:

(1) The bed absorbs and concentrates the compounds on a large surface area to allow decomposition by ultra-violet light of the accessible, concentrated compounds;

(2) The bed also seems to have a catalytic effect which enhances the decomposition by ultraviolet light.

Thus the prototype detoxification unit, employing silica gel irradiated with ultraviolet light, can be used in a wide variety of systems in modified forms to destroy a wide variety of volatile organic halogenated compounds. It is believed that any organic halogenated compound which can be decomposed by ultraviolet light and which can be volatized from aqueous solution, can be decomposed by the detoxification unit. Such volatile organic halogenated compounds include, but are not limited to: tetrachloroethylene; vinyl chloride; carbon tetrachloride; ethylene dibromide; methylene chloride, 1,1,1,-trichloroethane; chlorobenzene; hexachloroethane; 1,1-dichloroethane; 1,1,2-trichloroethane, 1,1,2,2-tetrachloroethane; chloroethane; bis(-chloromethyl) ether; bis (2-chloroethyl) ether; 2-chloroethyl vinyl ether (mixed); chloroform; 1,2-dichlorobenzene; 1,3-dichlorobenzene; 1,4-dichlorobenzene; 1,1-dichloroethylene; 1,2-transdichloroethylene; 1,2-dichloropropane; 1,2-dichloropropylene; bis (2-chloroisopropyl) ether; bis (2-chloroethoxy) methane; methyl chloride; methyl bromide; bromoform; dichlorobromomethane; trichlorobromomethane; trichlorofluoromethane; dichlorofluoromethane; chlorodibromomethane; and 1,2,dibromo-3,chloropropane. It has also been shown that nitrosamines, although they are not halogenated, can be effectively decomposed by the prototype detoxification unit.

2. Detoxification Unit Using a Bed of Quartz Chips

Once it was determined that the silica gel bed in combination with ultraviolet light did increase rate of trichloroethylene destruction, a slightly modified apparatus, similar in function to a conventional counter-current air stripping tower, was fabricated. The modified appparatus (not shown) passed water downwardly through a column of aluminum chips and passed air upwardly through the column. The air then flowed to a one-inch diameter detoxification unit which had either a bed of silica gel or porous quartz chips irradiated by ultraviolet light, and was in all other respects the same as the two-inch diameter detoxification unit 212 seen in FIG. 3.

Using this apparatus, it was demonstrated that the bed of quartz chips also enhanced the rate of trichloroethylene decomposition, however, the rate did not increase to as high a level as that observed when a silica gel bed was used.

The results of these experiments in which the halogenated compounds were stripped from water in an aluminum chip column by counter-current air flow, in combination with the results of the experiments summarized in Table 1 and Table A, shows that the detoxification unit of this invention could accept and purify contaminated air from a conventional counter-current current water/air stripping tower. Contaminated air flowing from water/air stripping tower is generally simply released to the atmosphere.

Other experiments also demonstrated that the detoxification unit of this invention could decompose volatile organic halogenated compounds carried by any of dry, humid or water saturated air.

3. 185 Nanometer Wavelength Light

The ultraviolet light used when performing all these experiments contained a plurality of wavelengths, including some wavelengths between 185 namometer to 254 namometer. A set of unreported experiments was conducted to determine if the wavelengths of the ultraviolet light affected the rate of halogenated compound decomposition. In these experiments, described in greater detail below, ozone was added to a solution of organic halogenated compounds and the solution was irradiated with ultraviolet light.

(a) The Experimental Procedure

An aqueous solution of organic halogenated compounds was introduced into a reactor tank with one centrally located 40 watt ultraviolet lamp. Through the bottom of the tank was fed a mxxture of ozone/oxygen, or ozone/air, or ozone/nitrogen.

Two different 40 watt ultraviolet lamps were used with these experiments, both of these lamps emitted the major part of their energy at 254 nanometer. One of these two lamps also emitted some of its energy at 185 nanometer energy, but less than 1% of the total. The lamp with the 185 nanometer component increased the oxidation rate of 1,2,dibromo-3,chloropropane, various PCBs, Lindane and hexachlorobenzene, three-fold as compared with the oxidation rate achieved with the lamp which did not have the 185 nanometer component. Thus the oxidation rate of these halogenated compounds is increased by increasing the proportion of 185 nanometer energy. These results can reasonably be extrapolated and it can be seen that the decomposition rate of other halogenated compounds would also likely be increased by lamps which emit more than 1% of their energy at 185 nanometer. However, when using lamps which either emitted some 185 nanometer energy, or did not emit any, for the ultraviolet-ozonation of pentachorophenol, the oxidation rate was only about 10% greater than the oxidation rate achieved when using ozone in the absence of ultraviolet light.

4. Elevating the Temperature of Solution

In a set of experiments summarized at Table 2, it was demonstrated that the oxidation rate of certain organic compounds in aqueous solution, when $H_2O_2$ is added to the solution and it is thereafter irradiated with ultraviolet light, was enhanced by elevating the temperature of solution to 80° C.

TABLE 2

| OXIDATION OF ORGANICS WITH UV/$H_2O_2$ at 80° C. | | | | |
|---|---|---|---|---|
| Compounds Oxidized | Time** (min) | Temp (°C.) | Number of Runs | Total of Organic Carbon*** (ppm) |
| Fatty acids | 0 | 80 | 6 | 33.300 |
|  | 480 | 80 |  | 12,700 |
|  | 780 | 80 |  | 7,200 |
| Fatty acids | 0 | RT* | 1 | 33,300 |
|  | 480 | RT* |  | 23,400 |
| Naphthenic acids | 0 | RT* | 1 | 430 |
|  | 120 | RT* |  | 215 |
| Naphthenic acids | 0 | 80 | 2 | 430 |
|  | 120 | 80 |  | 42 |

*RT indicates the reaction was carried out at room temperatures.
**Time indicates the time of treatment with ultraviolet light (in minutes)
***Compound concentrations are listed in "Total of Organic Carbon" at start of treatment (time = 0), and following treatment for the times specified.

Comparing the tests done at room temperature with those done at 80° C. it can be seen that elevating the reaction temperature increased the oxidation rate of all the compounds listed on Table 2. In a set of unreported experiments it was shown that elevating the reaction temperature to 80° C. also increased the oxidation rate (in a system using ultraviolet light and $H_2O_2$ for oxidation) of solutions of the following compounds:

(a) formaldehyde and formic acid;
(b) citric acid and oxalic acid;
(c) phenol and methylene chloride;
(d) phenol and isopropyl alcohol.

It was observed that the oxidation rate of certain long chain alcohols was not enhanced by elevating the temperature when using ultraviolet light and $H_2O_2$.

In another set of experiments it was shown that the rate of oxidation of certain compounds in aqueous solution, when using irradiation of the solution with ultraviolet light and addition of ozone to the solution, was enhanced by elevating the solution temperature to 80° C. The results are summarized at Table 3.

TABLE 3

| OXIDATION OF ORGANICS WITH UV/$O_3$ at 80° C. | | | | |
|---|---|---|---|---|
| Compounds Oxidized (major constituents) | Time** (min) | Temp. (°C.) | TOC*** (ppm) | Number of runs |
| Phenol + methylene chloride | 0 | RT* | 5310 | 1 |
|  | 150 | RT* | 5680 |  |
|  | 260 | RT* | 4520 |  |
| Phenol + methylene chloride | 0 | 80 | 5310 | 1 |
|  | 150 | 80 | 5167 |  |
|  | 260 | 80 | 2372 |  |
| Naphthenic acids | 0 | RT* | 141 | 1 |
|  | 60 | RT* | 76 |  |
|  | 90 | RT* | 10 |  |
| Naphthenic acids | 0 | 80 | 141 | 2 |
|  | 60 | 80 | 34 |  |
|  | 90 | 80 | N.D.**** |  |
| Naphthenic acids | 0 | 80 | 340 | 3 |
|  | 120 | 80 | 60 |  |

*RT indicates the reaction was carried out at room temperature.
**Time, indicates time of treatment with ultraviolet light (in minutes)
***TOC means total of organic carbon concentration at start of treatment (time = 0), and following treatment for the times specified.
****N.D. means none was detectable.

Comparing the tests done at room temperature with those done at 80° C., it can be seen that elevating the temperature increases the oxidation rate. In a set of unreported experiments it was shown that the oxidation rate of both Butachlor and EDTA (when using ultraviolet light and ozone for oxidation) was also increased by elevating the temperature to 80° C.

It was also observed that when using this system, the oxidation rate of long chain alcohols was not increased by elevating the temperature.

Other Applications

The basic organic halogenated compound detoxification unit (using a bed of either silica gel or quartz chips and irradiation with ultraviolet light) can also be used in a wide variety of industrial applications other than those previously described. These halogenated compounds are used and/or produced in dry cleaning, in incinerators which produce these compounds as off-gases, in many chemical processes, following chemical spills, and in chemical storage tanks; the unit could be used for detoxification in any of these systems. It is also hypothesized that a smaller-mesh silica gel bed could be used as a purification system for water which contains bacteria. It is known that ultraviolet light kills bacteria and it is believed that passing bacteria contaminated water through the detoxification unit would increase the rate of bacterial destruction.

It is believed that electromagnetic radiation with wavelengths shorter than ultraviolet light may also effectively decompose the aforementioned volatile organic halogenated compounds when used to irradiate a bed of silica gel or quartz chips in a system wherein a gaseous mixture of these compounds is passed through the bed. Additionally, it is believed that materials other than silica gel or quartz chips, which possess the ability to absorb and concentrate volatile organic halogenated compounds, can be used with the detoxification units of the invention.

Other modifications and variations of the present invention are possible without departing from the spirit hereof; the invention is therefore limited only by the scope of the claims which follow.

What is claimed is:

1. An apparatus for decomposing volatile organic halogenated compounds contained in gases comprising:
   (a) a housing having a gas supply port, a gas exhaust port, and a gas flow path between said gas supply port and said gas exhaust port;
   (b) a porous, adsorbent bed located in said gas flow path, wherein said porous, adsorbent bed is capable of adsorbing volatile organic halogenated compounds from the gaseous state; and
   (c) means for irradiating said porous, adsorbent bed with ultraviolet light, said porous, adsorbent bed surrounding and said irradiating means at a distanct effective to promote recuction of said halogenated volatile organic compounds in said gases.

2. The apparatus of claim 1 wherein said means for irradiating is at least one ultraviolet lamp.

3. The apparatus of claim 1 wherein said means for irradiating irradiates said porous, adsorbent bed with ultraviolet light containing a substantial portion of light having a wavelength of about 185 nanometers.

4. The apparatus of claim 1 wherein said porous adsorbent bed is a 6 to 16 mesh bed of silica gel.

5. The apparatus of claim 1 wherein said means for irradiating irradiates said porous adsorbent bed with ultraviolet light containing wavelengths from about 185 nanometers to about 254 nanometers.

6. The apparatus of claim 1 wherein said porous adsorbent bed comprises a material selected from the group consisting of quartz chips and silica gel.

7. An apparatus for decomposing organic compounds contained in solution, comprising:

(d) a reactor tank for simultaneously exposing a contaminated solution to ultraviolet light and ozone to oxidize organic compounds in the solution and to volatize organic compounds from the solution, said reactor tank having at least one influent port for incoming solution and at least one effluent port for outgoing solution, and said reactor tank having at least one gas diffuser tube proximal to the influent port for introducing ozone into the contaminated solution in the tank, and said reactor tank containing ultraviolet irradiation means;
   (e) ozone generator means coupled to at least one gas diffuser tube for generating ozone from air to produce an ozone-air mixture, and for introducing the ozone-air mixture into said reactor tank for reaction with the contaminated solution; and
   (f) a detoxification unit coupled to the reactor tank for decomposing volatized organic compounds removed from the contaminated solution in the reactor tank said detoxification unit having a plurality of irradiating means for irradiating the volatized organic compounds, said irradiating means enclosed in quartz sheaths in said detoxification unit; and having a porous adsorbent bed for adsorbing ozone and organic compounds arranged such that said porous, adsorbent bed is surrounding and in contact with said quartz sheaths.

8. The apparatus of claim 7 wherein said reactor tank further comprises a plurality of chambers formed by a plurality of longitudinal baffles to facilitate flow of the influent solution in the chambers from the influent port to the effluent port of the reactor tank, said baffles disposed parallel to each other and having a length which is less than the width of the reactor tank to allow passage of the solution between the channels formed by said baffles.

9. The apparatus of claim 8 wherein the gas diffuser tube is located at the base of a chamber proximal to the influent port of the reactor tank.

10. The apparatus of claim 8 wherein said irradiation means comprise a plurality of ultraviolet lamps, said lamps placed vertically in the chambers of the reactor tank relative to the longitudinal placement of the baffles.

11. The apparatus of claim 10 wherein said ultraviolet lamps irradiate with light containing wavelengths of from about 185 nanometers to about 254 nanometers.

12. The apparatus of claim 7 wherein said porous adsorbent bed comprises silica gel.

13. The apparatus of claim 7 further comprising a degasser for removing residual ozone from the air mixture after treatment in the detoxification unit and from the effluent solution after treatment in the reactor tank, said degasser having a first inlet coupled to the reactor tank for entry of effluent solution from the reactor tank, a second inlet coupled to said detoxification unit for entry of air from said detoxification unit, irradiating means for irradiating the effluent solution and the air mixture in said degasser, and said degasser having a first outlet port coupled to said ozone generating means for returning air from which residual ozone has been removed to said ozone generating means.

14. The apparatus of claim 13 wherein said irradiating means in said degasser comprise ultraviolet lamps enclosed in quartz sheaths.

15. The apparatus of claim 14 including six illuminating means in said degasser.

16. The apparatus of claim 13 further comprising a vent for receiving external air to replace air lost in the reactor tank.

17. The apparatus of claim 13 further comprising a level gauge coupled to the degasser for detecting the level of solution in the degasser.

18. The apparatus of claim 13 wherein said degasser further comprises a second outlet port coupled to the reactor tank for returning effluent solution to the reactor tank for further treatment.

19. The apparatus of claim 18 further comprising pump means coupled to said degasser for moving the effluent solution from the degasser to the reactor tank.

20. The apparatus of claim 7 further comprising at least one compressor for pressurizing and moving air from the environment through the apparatus.

21. The apparatus of claim 20 further comprising a drier coupled to the compressor for reducing the moisture content of air entering the compressor.

22. The apparatus of claim 21 further comprising a second compressor coupled to the detoxification unit for moving the air mixture containing ozone and volatized organic compounds from the reactor tank to the detoxification unit.

23. The apparatus of claim 7 wherein said detoxification unit includes means for heating said porous, adsorbent bed.

24. A detoxification unit for decomposing volatile organic compounds contained in gases comprising:
(a) a housing having a gas supply port, a gas exhaust port and a gas flow path between said gas supply port and said gas exhaust port:
(b) a plurality of irradiating means for irradiating a contaminated gas in said housing;
(c) quartz sheaths surrounding said irradiating means; and
(d) a porous, adsorbent bed for adsorbing ozone and organic compounds present in the contaminated gas, said bed surrounding and in contact with said quartz sheaths.

25. The detoxification unit of claim 24 wherein said porous, adsorbent bed comprises silica gel.

26. The apparatus of claim 25 wherein said irradiating means irradiate with light containing wavelengths of from about 185 nanometers to about 254 nanometers.

27. An apparatus for decomposing volatile and non-volatile organic compounds contained in a solution comprising:
(a) a reactor tank for decomposing organic compounds present in a contaminated solution, having a first compartment and a second compartment, said first compartment for volatizing and oxidizing organic compounds in the solution and having an influent port, means for heating said contaminated solution, and means coupling said first compartment to said second compartment for moving partially detoxified solution from said first compartment into said second compartment, said second compartment for decomposing non-volatile organic compounds in the solution and having an effluent port, at least one gas diffuser, a first exit port for passage of ozone from the top of the second compartment and a second exit port for exit of treated solution from the second compartment;
(b) ozone generating means for generating ozone and coupled to said gas diffuser in said second compartment;
(c) an ozone decomposer coupled to said first exit port in said second compartment of said reactor tank for producing oxygen from ozone for release from the apparatus into the environment; and
(d) a detoxification unit coupled to the first compartment of said reactor tank for decomposing volatized organic compounds removed from the contaminated solution in the first compartment of the reactor tank, said detoxification unit having a plurality of irradiating means for irradiating the volatized organic compounds.

28. The apparatus of claim 27 further comprising means coupling the top of said detoxification unit to at least one gas diffuser located in the bottom of said first compartment for moving detoxified air from the detoxification unit into said first compartment.

29. The apparatus of claim 27 wherein said irradiating means in the detoxification unit are enclosed in quartz sheaths.

30. The apparatus of claim 29 further comprising a porous, adsorbent bed surrounding and in contact with said quartz sheaths.

31. The apparatus of claim 30 wherein the porous, adsorbent bed comprises silica gel.

32. The apparatus of claim 31 wherein said irradiating means are ultraviolet lamps irradiating light containing a substantial portion of light having a wavelength of aproximately 185 nanometers.

33. The apparatus of claim 27 wherein the apparatus further comprises means for introducing an oxidizing solution into the reactor tank, for catalyzing the oxidation of compounds present in the contaminated solution.

34. The apparatus of claim 33 further comprising a heater coupled to the reactor tank for preheating the influent solution prior to entry into the reactor tank.

35. The apparatus of claim 27 further comprising means for returning treated, effluent solution from the second compartment of the reactor tank to the first compartment for further treatment.

36. The apparatus of claim 35 having a heat exchanger coupled to the means for returning effluent solution, prior to entry of solution into the first compartment of the reactor tank, for transferring heat from the effluent solution exiting the reactor tank to the influent solution entering the reactor tank.

37. The apparatus of claim 27 further comprising a level gauge in the first compartment of the reactor tank for indicating the level of solution in the first compartment.

38. The apparatus of claim 27 further comprising a level gauge located in the second compartment of the reaction tank for indicating the level of solution in the second compartment.

* * * * *

UNITED STATES PATENT AND TRADEMARK OFFICE
CERTIFICATE OF CORRECTION

PATENT NO. : 4,780,287
DATED : October 25, 1988
INVENTOR(S) : ZEFF ET AL

Page 1 of 4

It is certified that error appears in the above-identified patent and that said Letters Patent is hereby corrected as shown below:

Abstract - Col. 2, line 27 - delete [nano-m] and insert nanometer

Col. 1, line 37 - delete [volatize] and insert volatilize
Col. 2, line 13 - delete [nano-m] and insert nanometers
Col. 3, line  2 - delete [nano-m] and insert nanometers (twice)
       line 18 - delete [volatized] and insert volatilized
       line 24 - delete [late] and insert later
       line 38 - delete [volatized] and insert volatilized
Col. 4, lines 50-51 - delete [nanometer] and insert nanometers
       line 58 - delete [diaphram] and insert diaphragm
Col. 5, line 24 - delete [volatized] and insert volatilized
       line 46 - delete [volatization] and insert volatilization
Col. 6, line 16 - after "308," insert having an exhaust 324,
Col. 8, lines 1-17 - delete and insert in Column 7 to
       complete Table A
Col. 8, line 18 - delete [on] and insert in
Col. 9-10, line  7 - delete [5.] and insert 5
       line 44 - delete [Ethylene Dibromide] and insert
           ethylene dibromide
Col. 11, line  6 - delete [volatized] and insert volatilized
Col. 12, line  2 - delete [volatized] and insert volatilized
       line 60 - after "increase" insert - the
Col. 13, lines 26-27 - delete [namometer] and insert nanometers
       line 38 - delete [mxxture] and insert mixture
Col. 15, lines 46-50 - delete [(c) means ... gases.] and
       insert
    (c) means for irradiating said porous, adsorbent bed
       with ultraviolet light, said porous adsorbent bed
       surrounding said irradiating means and at a distance
       effective to promote reduction of said halogenated
       volatile organic compounds in said gases.

UNITED STATES PATENT AND TRADEMARK OFFICE
CERTIFICATE OF CORRECTION

PATENT NO. : 4,780,287

DATED : October 25, 1988

INVENTOR(S) : ZEFF ET AL

It is certified that error appears in the above-identified patent and that said Letters Patent is hereby corrected as shown below:

```
Col. 16, line  4 - delete [volatize] and insert volatilize
         line 18 - delete [volatized] and insert volatalized
         line 56 - delete [.] and insert, Col. 17, line 52 - delete [volatizing] and insert volatilizing
Col. 18, line 34 - delete [aproximately] and insert approximately
         line 59 - delete [reaction] and insert reactor
```

Figures 3, 4, 5 and 6 should be deleted and replaced with Figures 3, 4, 5 and 6 as shown on the attached sheets.

Signed and Sealed this

Sixteenth Day of May, 1989

Attest:

DONALD J. QUIGG

Attesting Officer

Commissioner of Patents and Trademarks